United States Patent
Hannedouche et al.

(10) Patent No.: US 11,706,621 B2
(45) Date of Patent: Jul. 18, 2023

(54) DEVICE REGISTRATION TO MANAGEMENT DOMAIN

(71) Applicant: Seagate Technology LLC, Fremont, CA (US)

(72) Inventors: Francois Xavier Hannedouche, Paris (FR); Ludovic Raulet, Paris (FR); John Anthony Fletcher, Longmont, CO (US); Nicholas James Dance, Longmont, CO (US); Dieter P. Schnabel, Longmont, CO (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 188 days.

(21) Appl. No.: 16/985,100

(22) Filed: Aug. 4, 2020

(65) Prior Publication Data

US 2022/0046418 A1 Feb. 10, 2022

(51) Int. Cl.
*H04W 12/069* (2021.01)
*H04L 9/40* (2022.01)

(52) U.S. Cl.
CPC ....... *H04W 12/069* (2021.01); *H04L 63/0428* (2013.01)

(58) Field of Classification Search
None
See application file for complete search history.

(56) References Cited

U.S. PATENT DOCUMENTS

| 2003/0163787 | A1 | 8/2003 | Hay et al. |
| 2007/0192588 | A1 | 8/2007 | Roskind et al. |
| 2014/0040628 | A1 | 2/2014 | Fort et al. |
| 2015/0127930 | A1 | 5/2015 | Offenberg et al. |
| 2017/0154333 | A1* | 6/2017 | Gleeson .............. H04L 63/0853 |
| 2019/0253404 | A1 | 8/2019 | Briceno et al. |
| 2020/0162255 | A1* | 5/2020 | Hunt ..................... H04L 63/083 |
| 2020/0226258 | A1 | 7/2020 | Nix |

OTHER PUBLICATIONS

Marktscheffel et al., QR Code Based Mutual Authentication Protocol for Internet of Things, Jun. 21, 2016 (Year: 2016).*
Marktscheffel, Tobias, et al., "QR code based mutual authentication protocol for Internet of Things", 2016 IEEE 17th International Symposium on a World of Wireless, Mobile and Multimedia Networks (Wowmom), IEEE, Jun. 21, 2016, pp. 1-6.
Search Report completed by the European Patent Office dated Dec. 16, 2021 for European Application 21186822.9.

* cited by examiner

*Primary Examiner* — Brandon Hoffman

(74) *Attorney, Agent, or Firm* — Holzer Patel Drennan

(57) ABSTRACT

The technology disclosed herein pertains to a method for mobile storage device registration to a management domain using a random token and a pin. In at least one implementation, a technology disclosed herein provides a method of authenticating a device on a system, the method including generating a random token, displaying the random token to a user, communicating the random token to an authentication system portal, in response the authentication system portal validating the random token receiving a PIN from the user, and communicating the PIN to the authentication system portal, and receiving a portal IP address and a certificate of authentication from the authentication system portal.

20 Claims, 5 Drawing Sheets

DEVICE REGISTRATION TO MANAGEMENT DOMAIN

BACKGROUND

Modern distributed computing and storage systems may include a large number of remote and/or mobile devices that communicate and share data with one or more administration systems. Generally, the administration system may require the remote device to register with the system by authenticating with the system. Often remote devices that may have limited input capability are also required to be added to a management system which authenticates such remote devices. Some remote devices may have limited ability to accept input and/or to communicate with the management domain.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages of the claimed subject matter will be apparent from the following, more particular written Detailed Description of various implementations as further illustrated in the accompanying drawings and defined in the appended claims.

The technology disclosed herein pertains to a method for mobile storage device registration to a management domain using a random token and a pin. In at least one implementation, a technology disclosed herein provides a method of authenticating a device on a system, the method including generating a random token, displaying the random token to a user, communicating the random token to an authentication system portal, in response the authentication system portal validating the random token receiving a PIN from the user, and communicating the PIN to the authentication system portal, and receiving a portal IP address and a certificate of authentication from the authentication system portal.

These and various other features and advantages will be apparent from a reading of the following Detailed Description.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

DETAILED DESCRIPTION

Often remote devices that may have limited input capability are also required to be added to a management system which authenticates such remote devices. The device can generate a token and may have limited ability to accept input. This method allow for the device to be added to the administration domain without providing user credentials to the device.

Implementations described herein provide a method for mobile storage device registration to a management domain using a random token and a pin. In at least one implementation, a technology disclosed herein provides a method of authenticating a device on a system, the method including receiving a random token generated by the device from a user at a system portal, in response to receiving a random token at the system portal generating a device personal identification number (PIN), and generating an authentication IP address for authenticating the device to the system portal, receiving a request for device authentication at the authentication IP address, the request for device authentication including the device PIN, and authenticating the device on the device portal.

Figure 1:
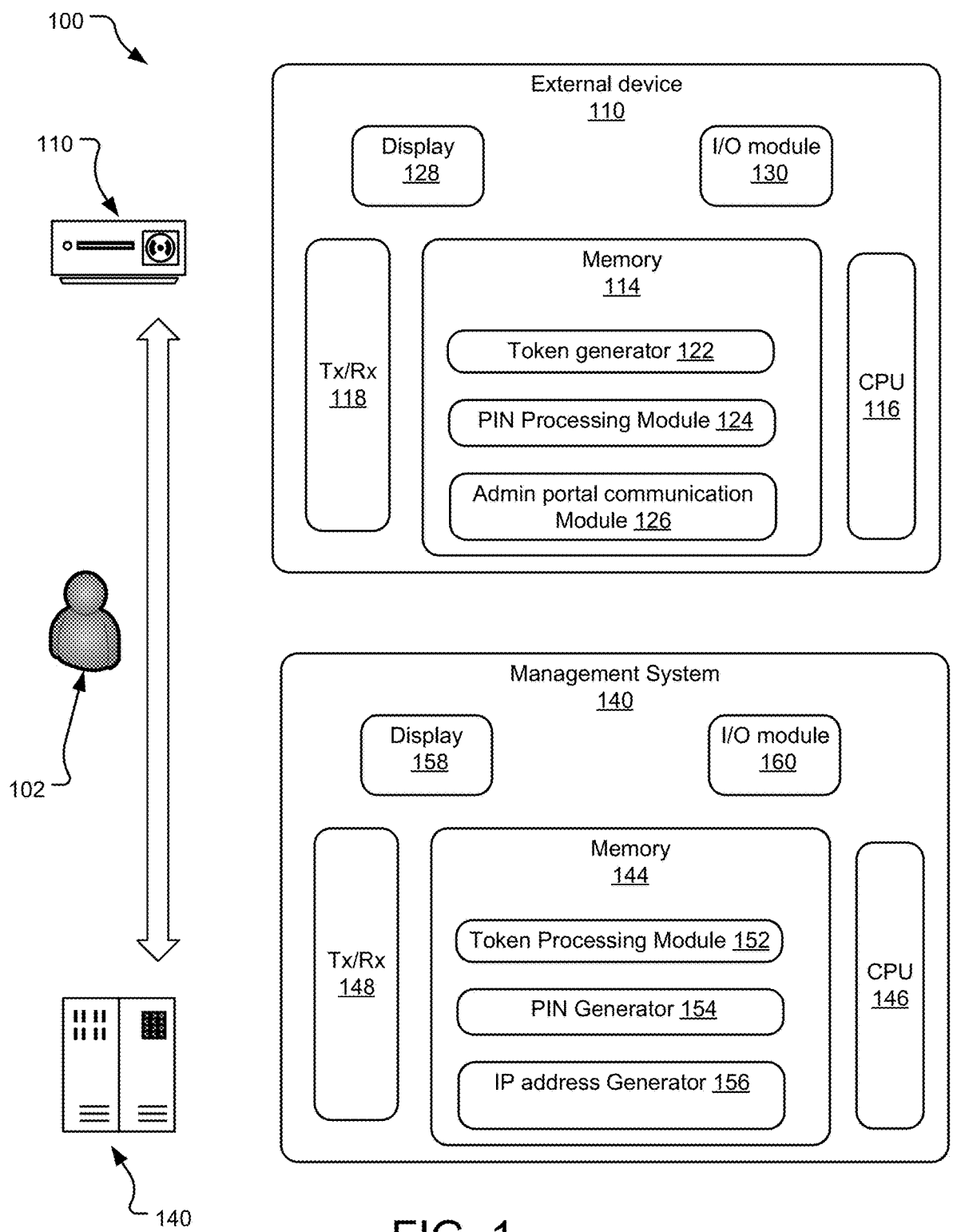
FIG. 1 illustrates an example block diagram of a system that allows a remote device to authenticate with a management domain.

FIG. 1 illustrates an example block diagram of a device registration system 100 that allows a remote device to authenticate with a management domain. Specifically, the device registration system 100 allows one or more external devices, such as an external device 110 to register with a management system 140. The external device 110 may be a storage drive for data, audio visual material, etc. In one implementation, the external device 110 may be a device that has limited input capabilities and/or it may be in a location where it has limited communication bandwidth available.

The external device 110 may include an Input/output module 130 that communicates via a display 128 with a user 102. For example, the user may be able to view a token via the display 128. The external device 110 may also include a memory 114 that is configured to store one or more instructions for various software modules and other data that may be executed using a processor 116. In one implementation, the memory 114 may include a token generator 122 that generates a random token. For example, the token generator 122 may generate the random token based on a process of the external device 110. However, alternatively, the random token may be generated using a software process provided by Java, Python, or other computing languages. Furthermore, in one implementation, the random token may be a unique random token.

An example of a random token may be a unique alphanumeric string that can be displayed to the user 102 via the display 128. For example, the token may be generated by a secure random number generator and the token may have a length such that it cannot be guessed by any computerized or any other method within a fixed amount of time during which the token is valid. The user 102 may read such random alphanumeric code and provide the code to the management system 140 via its input/output module 160. Alternatively, the unique random token may be a represented by a machine readable identifier, such as a bar code, a QR code, etc., that can be displayed using the display 128. In such an implementation, the user 102 may be able to take an image of such unique identifier. For example, in response to the user taking an image of such unique identifier, the mobile device of the user 102 may redirect the user to a portal for the management system 140 or automatically provide the unique identifier to the management system 140.

The memory 114 may also include a PIN processing module 124 that processes a PIN provided to the user 102 by the management system 140. In one implementation, the PIN processing module 124 may process the PIN and communicate with the management system 140 with an encrypted version of the PIN. In response to receiving the encrypted PIN, the management system decrypts the PIN, verifies it, and provides an IP address or a pre-programmed storage administration portal address to the external device. Upon receipt of the IP address or a pre-programmed storage administration portal address, an admin portal communication module 126 may communicate with such IP address or a pre-programmed storage administration portal address using a transceiver 118.

The management system 140 may be a management system that manages registration of and communication with a number of external devices, including the external device 110. The management system 140 may be configured as a server to a number of client external devices. The management system 140 includes a memory 144 configured to store data and a number of computing instructions that may be processed using a CPU 146. The management system 140 may communicate with the external devices using a transceiver 148. An input/output module 160 and a display 158 allows the user 102 to interact with the management system 140.

In one implementation, the user 102 inputs the random token generated by the external device 110 into the management system 140 using the input/output module 160. For example, the user 102 may log into the management system 140 using a web portal or a mobile device application and provide the alphanumeric random token generated by the external device 110 to the management system 140. A token processing module 152 processes the random token provided by the user. For example, the token processing module 152 processes the random token to validate the token. Specifically, the user 102 who has the physical possession of the external device 110 may enter the token into the management system 140. By reading the token from the external device 110 and entering it into the management system 140, the token is registered with the management system 140. The value of the token input to the management system 140 is cross-checked against the value of the token provided by the external device 110 to the user 102. When the user 102 enters the token into the management system 140, the token is registered with the management system 140.

In one implementation, the token generated by the external device 110 may be generated subject to one or more rules that allows its validation. Such rules may provide that the token needs to conform to a given schema, such as given minimum or range for length, given character set, etc. Alternatively, the token may be restricted in terms of its re-use within a predetermined time period. Furthermore, the token may be valid only for a given time window and such time window may be enforced by both the external device 110 and the management system 140.

Once the random token from the external device 110 is validated, a PIN generator 154 may generate a PIN that can be used by the external device 110 to register itself with the management system 140. Specifically, the PIN may be entered by the user 102 into the external device 110. The combination of the PIN and the token may be used by the external device 110 to authenticate itself with the management system 140. In one implementation, such PIN may be another randomly generated token that is communicated to the external device 110. For example, the user 102 may provide this PIN to the external device 110. Once the external device receives the PIN from the management system 140, it processes and sends a request to the management system 140 for an IP address or a pre-programmed storage administration portal address where it can register the external device 110 with the management system 140. An IP address generator 156 may generate such an IP address or a pre-programmed storage administration portal address that is also communicated to the external device 156.

Figure 2:
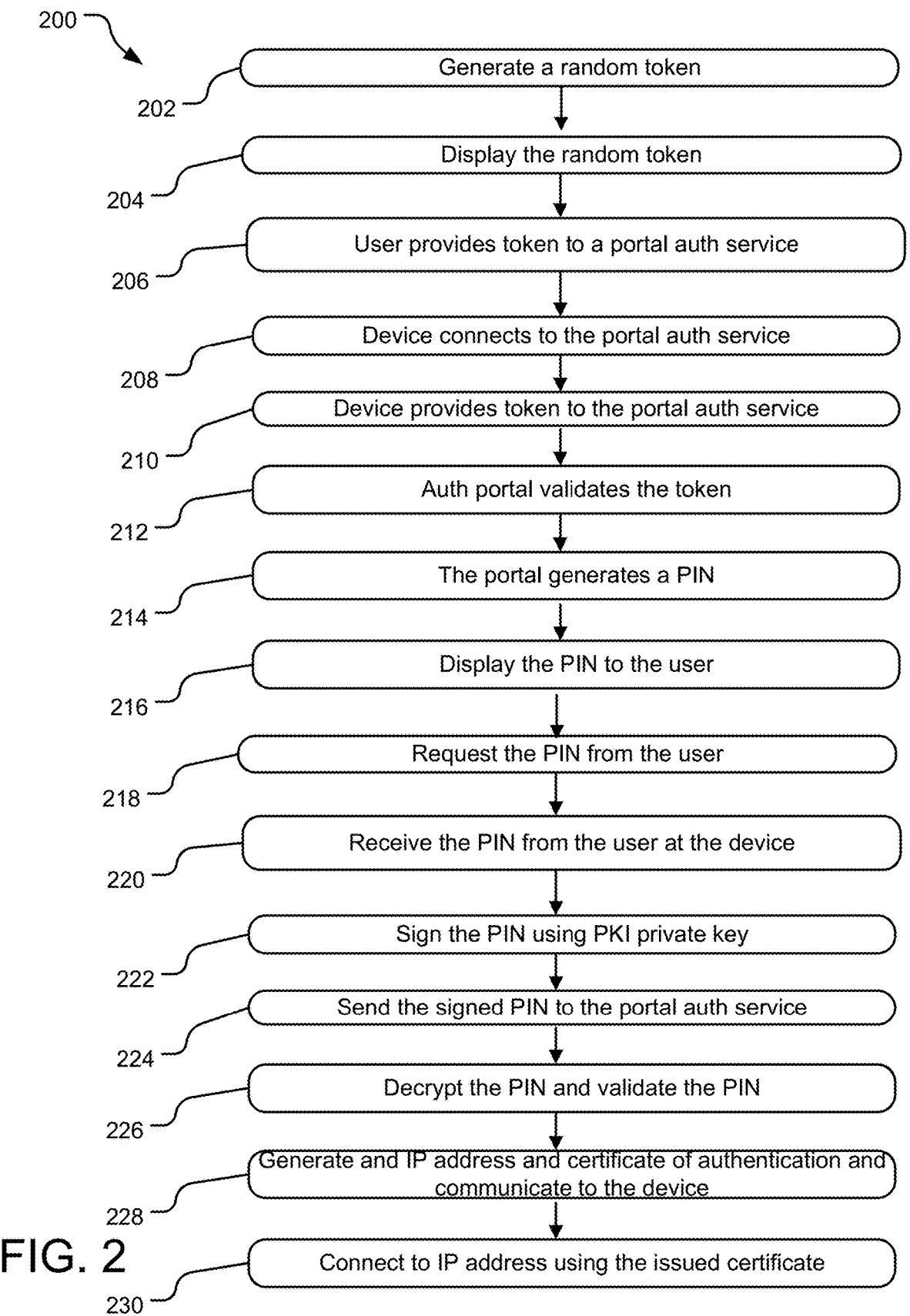
FIG. 2 illustrates example operations at a remote device for authenticating the remote device on a management domain.

FIG. 2 illustrates example operations 200 at a remote device for authenticating the remote device on a management domain. One or more of the operations 200 may be implemented as computer instructions on the memory of an external or remote device, such as the external device 110 disclosed in FIG. 1 and a management system such as the management system 140 disclosed in FIG. 1. An operation 202 generates a random token. The random token may be in the form of a unique alphanumeric string and may be represented in the form of a visual identifier, such as a QR code or a bar code. An operation 204 displays the random token to a user. For example, the random alphanumeric token may be displayed on an LED display on the external device. Alternatively, a visual identifier may be displayed on a visual display of the external device.

At operation 206, the user provides the random token to a portal authentication service of the management system. At operation 208, the external device connects to the portal authentication service and provides the token to the portal authentication service at an operation 210. The portal authentication service validates the token received from the external device against the token received from the user at operation 212. In response to validation of the token, at operation 214, the authentication portal of the management system generates a PIN. The authentication portal displays the PIN to the user at operation 216.

In response to receiving a request from the external device to authenticate with the portal, the portal may request the PIN from the device at operation 218. In response, the external device may request the PIN from the user and at operation 220 the user provides the PIN to the external device. Subsequently, at operation 222, the external device signs the PIN using its PKI private key and communicates the signed PIN to the portal authentication service at operation 224.

On the management system side, at operation 226, the authentication portal service decrypts the PIN from the external device using the external device's public key and validates it against its generated PIN. Upon validation of the PIN from the external device, at operation 228, the portal authentication service generates and IP address and a certificate for authenticated communication that can be used by the external device to communicate with the IP address, both of which are communicated to the external device. In one implementation, the authentication portal may associate a predetermined time-period for which the certificate for authenticated communication is valid.

At operation 230, the external device connects to the IP address using the certificate for authenticated communication issued by the authentication portal service and if the certificate for authenticated communication is valid and as long as the associated time has not expired, the external device is registered with the management system. However, if the authentication process is not completed within the time period associated with the certificate for authenticated communication, registration of the external device to the management system may be denied.

Figure 3:
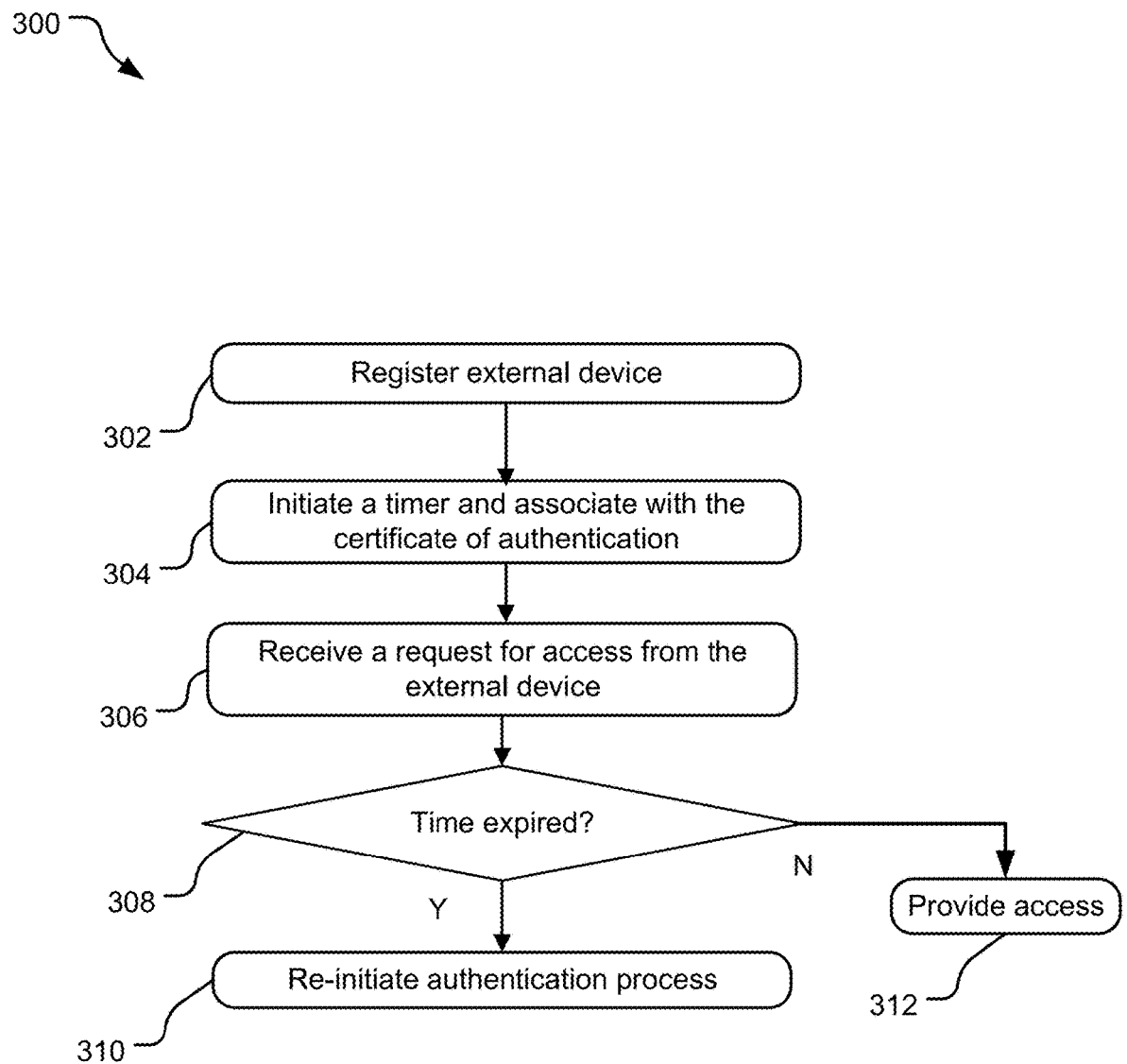
FIG. 3 illustrates alternative example operations for managing authentication of a remote device on a management domain.

FIG. 3 illustrates example operations 300 for managing authentication of a remote device on a management domain. One or more of the operations 300 may be implemented as computer instructions on the memory of a management system, such as the management system 140 disclosed in FIG. 1. An operation 302 registers an external device to the management system using the operations disclosed in FIG. 2. An operation 304 initiates a timer and associates the timer with the certificate of authentication communicated to the external device. For example, the operation 304 may set 60 minutes as the time for which registration of the external device is valid by setting the timer associated with the external device to 60 minutes.

An operation 306 receives a request from the registered external device for access to the management system. In response to the request, an operation 308 evaluates the time to determine the remaining time for which the external devices registration is valid. If it is determined that the registration is still valid, an operation 312 grans access to the external device to the management system. If it is determined that the time period for valid registration has expired, an operation 310 re-initiates the process for authentication of the external device.

Figure 4:
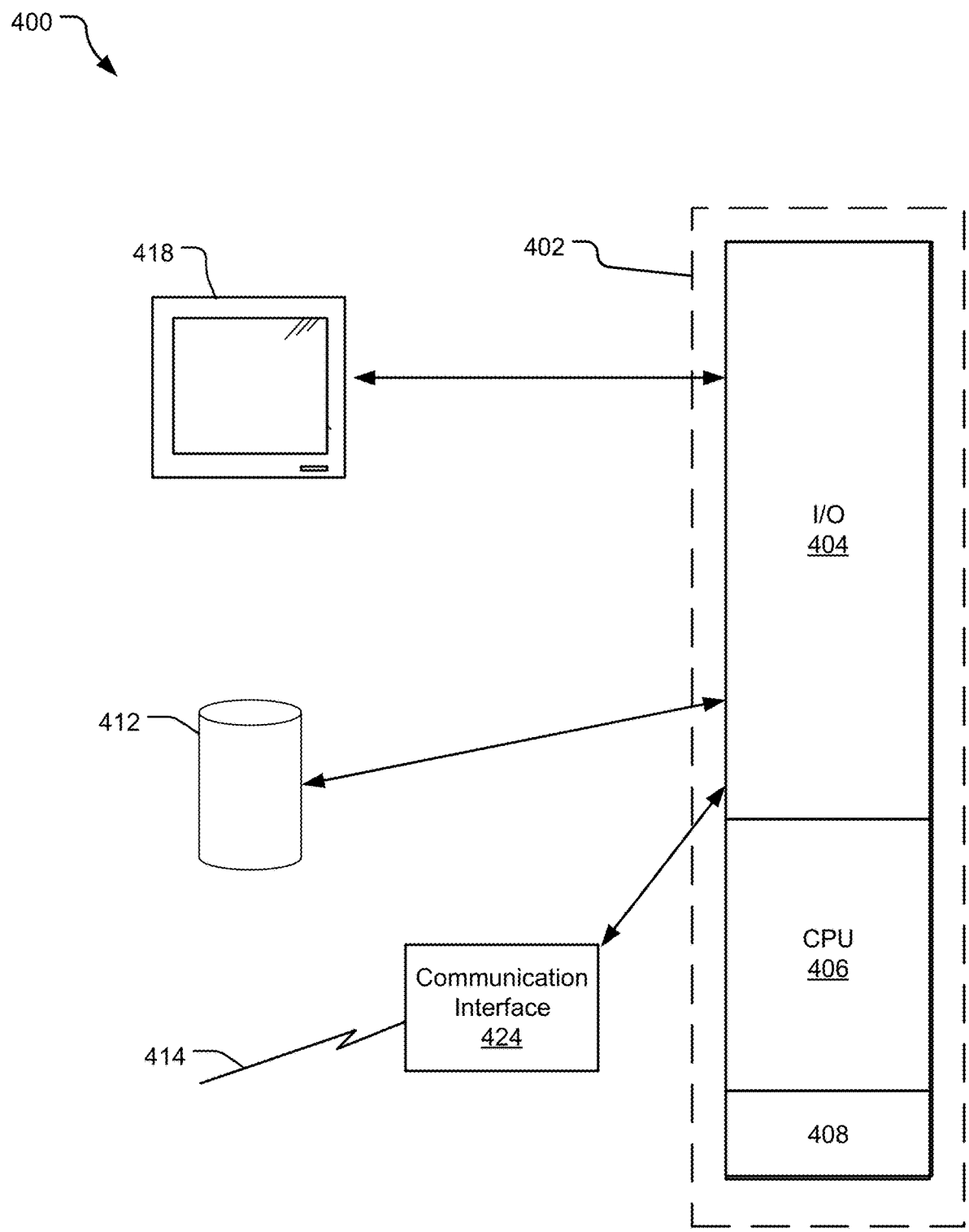
FIG. 4 illustrates an example processing system that may be useful in implementing the described technology.
Figure 5:
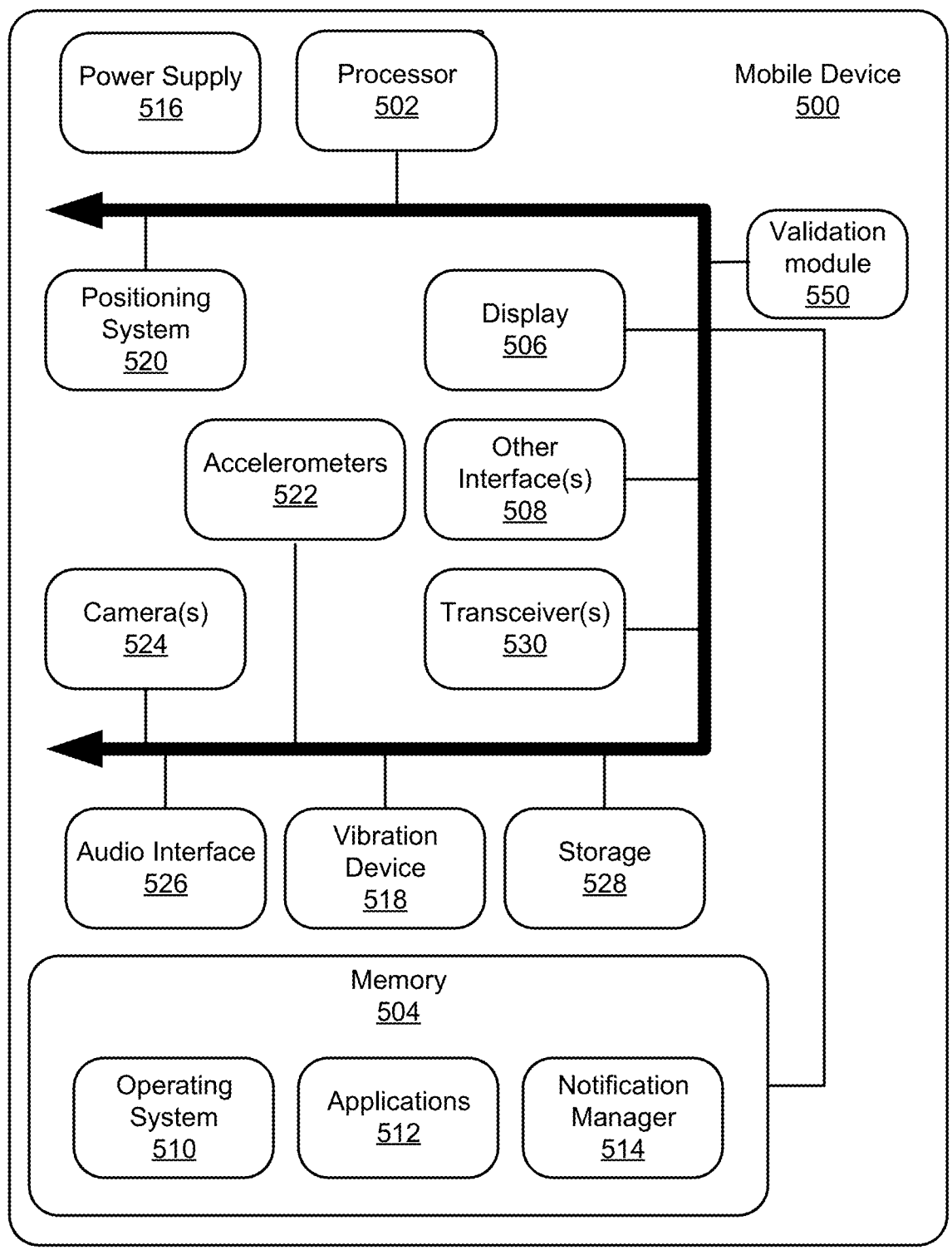
FIG. 5 illustrates an example mobile device that may be used to implement the system disclosed herein.

FIG. 4 illustrates an example processing system 400 that may be useful in implementing the described technology. The processing system 400 is capable of executing a computer program product embodied in a tangible computer-readable storage medium to execute a computer process. Data and program files may be input to the processing system 400, which reads the files and executes the programs therein using one or more processors (CPUs or GPUs). Some of the elements of a processing system 400 are shown in FIG. 5 wherein a processor 402 is shown having an input/output (I/O) section 404, a Central Processing Unit (CPU) 506, and a memory section 508. There may be one or more processors 402, such that the processor 402 of the processing system 400 comprises a single central-processing unit 406, or a plurality of processing units. The processors may be single core or multi-core processors. The processing system 400 may be a conventional computer, a distributed computer, or any other type of computer. The described technology is optionally implemented in software loaded in memory 408, a storage unit 412, and/or communicated via a wired or wireless network link 414 on a carrier signal (e.g., Ethernet, 3G wireless, 8G wireless, LTE (Long Term Evolution)) thereby transforming the processing system 400 in FIG. 4 to a special purpose machine for implementing the described operations. The processing system 400 may be an application specific processing system configured for supporting a distributed ledger. In other words, the processing system 400 may be a ledger node.

The I/O section 404 may be connected to one or more user-interface devices (e.g., a keyboard, a touch-screen display unit 418, etc.) or a storage unit 412. Computer program products containing mechanisms to effectuate the systems and methods in accordance with the described technology may reside in the memory section 408 or on the storage unit 412 of such a system 400.

A communication interface 424 is capable of connecting the processing system 400 to an enterprise network via the network link 414, through which the computer system can receive instructions and data embodied in a carrier wave. When used in a local area networking (LAN) environment, the processing system 400 is connected (by wired connection or wirelessly) to a local network through the communication interface 424, which is one type of communications device. When used in a wide-area-networking (WAN) environment, the processing system 400 typically includes a modem, a network adapter, or any other type of communications device for establishing communications over the wide area network. In a networked environment, program modules depicted relative to the processing system 400 or portions thereof, may be stored in a remote memory storage device. It is appreciated that the network connections shown are examples of communications devices for and other means of establishing a communications link between the computers may be used.

In an example implementation, a user interface software module, a communication interface, an input/output interface module, a ledger node, and other modules may be embodied by instructions stored in memory 408 and/or the storage unit 412 and executed by the processor 402. Further, local computing systems, remote data sources and/or services, and other associated logic represent firmware, hardware, and/or software, which may be configured to assist in supporting a distributed ledger. A ledger node system may be implemented using a general-purpose computer and specialized software (such as a server executing service software), a special purpose computing system and specialized software (such as a mobile device or network appliance executing service software), or other computing configurations. In addition, keys, device information, identification, configurations, etc. may be stored in the memory 408 and/or the storage unit 412 and executed by the processor 402.

The processing system 400 may be implemented in a device, such as a user device, storage device, IoT device, a desktop, laptop, computing device. The processing system 400 may be a ledger node that executes in a user device or external to a user device.

Data storage and/or memory may be embodied by various types of processor-readable storage media, such as hard disc media, a storage array containing multiple storage devices, optical media, solid-state drive technology, ROM, RAM, and other technology. The operations may be implemented processor-executable instructions in firmware, software, hard-wired circuitry, gate array technology and other technologies, whether executed or assisted by a microprocessor, a microprocessor core, a microcontroller, special purpose circuitry, or other processing technologies. It should be understood that a write controller, a storage controller, data write circuitry, data read and recovery circuitry, a sorting module, and other functional modules of a data storage system may include or work in concert with a processor for processing processor-readable instructions for performing a system-implemented process.

For purposes of this description and meaning of the claims, the term "memory" means a tangible data storage device, including non-volatile memories (such as flash memory and the like) and volatile memories (such as dynamic random-access memory and the like). The computer instructions either permanently or temporarily reside in the memory, along with other information such as data, virtual mappings, operating systems, applications, and the like that are accessed by a computer processor to perform the desired functionality. The term "memory" expressly does not include a transitory medium such as a carrier signal, but the computer instructions can be transferred to the memory wirelessly.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

FIG. 5 illustrates another example system (labeled as a mobile device 500) that may be useful in implementing the described technology. The mobile device 500 includes a processor 502, a memory 504, a display 506 (e.g., a touchscreen display), and other interfaces 508 (e.g., a keyboard). The memory 504 generally includes both volatile memory (e.g., RAM) and non-volatile memory (e.g., flash memory). An operating system 510, such as the Microsoft Windows® Phone operating system, resides in the memory 504 and is executed by the processor 502, although it should be understood that other operating systems may be employed.

One or more application programs 512 are loaded in the memory 504 and executed on the operating system 510 by the processor 502. Examples of applications 512 include without limitation email programs, scheduling programs, personal information managers, Internet browsing programs, multimedia player applications, etc. A notification manager 514 is also loaded in the memory 504 and is executed by the processor 502 to present notifications to the user. For example, when a promotion is triggered and presented to the shopper, the notification manager 514 can cause the mobile device 500 to beep or vibrate (via the vibration device 518) and display the promotion on the display 506.

The mobile device 500 includes a power supply 516, which is powered by one or more batteries or other power sources and which provides power to other components of the mobile device 500. The power supply 516 may also be connected to an external power source that overrides or recharges the built-in batteries or other power sources.

The mobile device 500 includes one or more communication transceivers 530 to provide network connectivity (e.g., mobile phone network, Wifi®, BlueTooth®, etc.). The mobile device 500 also includes various other components, such as a positioning system 520 (e.g., a global positioning satellite transceiver), one or more accelerometers 522, one or more cameras 524, an audio interface 526 (e.g., a microphone, an audio amplifier and speaker and/or audio jack), and additional storage 528. Other configurations may also be employed.

In an example implementation, a mobile operating system, various applications, and other modules and services may be embodied by instructions stored in memory 504 and/or storage devices 528 and processed by the processing unit 502. User preferences, service options, and other data may be stored in memory 504 and/or storage devices 528 as persistent datastores. A device validation module 550 communicatively connected with the processor 502 and the memory 504 may enable one or more of the capabilities of the system disclosed herein.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of example embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of authenticating a device on a system, the method comprising:
   generating a random token;
   displaying the random token to a user;
   communicating the random token to an authentication system portal;
   in response to the authentication system portal validating the random token:
      receiving a PIN from the user, wherein the received PIN is generated by the authentication system in response to the authentication system portal validating the random token, and
      communicating the PIN to the authentication system portal; and
   receiving a portal IP address and a certificate of authentication from the authentication system portal.

2. The method of claim 1, wherein the certificate of authentication is associated with a predetermined amount of time.

3. The method of claim 1, wherein communicating the PIN to the authentication system portal further comprising encrypting the PIN using a private key of the device and communicating the encrypted PIN.

4. The method of claim 3, wherein receiving the portal IP address and the certificate of authentication further comprises receiving the portal IP address and a certificate of authentication in response to the authentication system portal decrypting the PIN using a public key of the device.

5. The method of claim 1, wherein the random token is a unique alphanumeric string.

6. The method of claim 5, wherein the random token is represented by a visual identifier.

7. The method of claim 6, further comprising:
   in response to the visual identifier being captured by a mobile phone, generating a communication message from the mobile phone to the authentication system portal.

8. A method of authenticating an external device, the method comprising:
   receiving a random token generated by the external device from a user at an authentication system portal;
   receiving the random token from the external device at the authentication system portal;

validating the random token based at least in part on the receiving of the random token from the user and the receiving of the random token from the external device;

in response to validating the random token at the authentication system portal:
generating an external device PIN, and
displaying the external device PIN to the user;

receiving an encrypted version of the external device PIN from the external device;

decrypting the encrypted version of the external device PIN; and validating the external device by comparing the decrypted external device PIN with the generated external device PIN.

9. The method of claim 8, wherein the random token is an alphanumeric string input at the authentication system portal by the user.

10. The method of claim 9, wherein the random token is a message received from a mobile device of the user in response to scanning of a visual identifier representing the alphanumeric string.

11. The method of claim 8, further comprising generating an IP address and a certificate of authentication in response to validating the external device.

12. The method of claim 11, further comprising associating an expiration time period to the certificate of authentication.

13. The method of claim 11, further comprising communicating the IP address and a certificate of authentication to the external device.

14. The method of claim 11, further comprising:
receiving an access request from the external device at the IP address with the certificate of authentication; and
providing access to the external device in response to determining that an expiration time period associated with the certificate of authentication has not expired.

15. One or more processor-readable storage media encoding processor-executable instructions for executing on a computer system a computer process, the computer process comprising:

receiving a random token generated by an external device from a user at an authentication system portal;

receiving the random token from the external device at the authentication system portal;

validating the random token based at least in part on the receiving of the random token from the user and the receiving of the random token from the external device;

in response to validating the random token at the authentication system portal:
generating an external device PIN, and
displaying the external device PIN to the user;

receiving an encrypted version of the external device PIN from the external device;

decrypting the encrypted version of the external device PIN; and validating the external device by comparing the decrypted external device PIN with the generated external device PIN.

16. The one or more processor-readable storage media of claim 15, wherein the random token is an alphanumeric string input at the authentication system portal by the user.

17. The one or more processor-readable storage media of claim 16, wherein the random token is a message received from a mobile device of the user in response to scanning of a visual identifier representing the alphanumeric string.

18. The one or more processor-readable storage media of claim 16, wherein the computer process further comprising generating an IP address and a certificate of authentication in response to validating the external device.

19. The one or more processor-readable storage media of claim 18, wherein the computer process further comprising associating an expiration time period to the certificate of authentication.

20. The one or more processor-readable storage media of claim 18, wherein the computer process further comprising communicating the IP address and a certificate of authentication to the external device.

* * * * *